US007965640B2

(12) United States Patent
Harada et al.

(10) Patent No.: US 7,965,640 B2
(45) Date of Patent: Jun. 21, 2011

(54) RADIO COMMUNICATION METHOD AND RADIO BASE STATION APPARATUS BASED ON VARIABLE TTI LENGTH CONTROL

(75) Inventors: Atsushi Harada, Kawasaki (JP); Minami Ishii, Yokohama (JP); Sadayuki Abeta, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 120 days.

(21) Appl. No.: 12/299,000

(22) PCT Filed: Apr. 26, 2007

(86) PCT No.: PCT/JP2007/059122
§ 371 (c)(1),
(2), (4) Date: Oct. 29, 2008

(87) PCT Pub. No.: WO2007/129601
PCT Pub. Date: Nov. 15, 2007

(65) Prior Publication Data
US 2009/0103447 A1 Apr. 23, 2009

(30) Foreign Application Priority Data
May 1, 2006 (JP) .................................. 2006-128001

(51) Int. Cl.
*H04L 12/26* (2006.01)
(52) U.S. Cl. ......... 370/236; 370/230; 370/310; 370/328
(58) Field of Classification Search .................. 370/229, 370/230, 230.1, 231, 235, 236, 310, 310.2, 370/326, 328
See application file for complete search history.

(56) References Cited

U.S. PATENT DOCUMENTS

| | | | | |
|---|---|---|---|---|
| 2004/0228315 A1* | 11/2004 | Malkamaki | | 370/342 |
| 2005/0152303 A1* | 7/2005 | Li et al. | | 370/328 |
| 2005/0202835 A1* | 9/2005 | Sato et al. | | 455/456.6 |
| 2006/0034285 A1* | 2/2006 | Pirskanen et al. | | 370/394 |
| 2006/0120404 A1* | 6/2006 | Sebire et al. | | 370/469 |

(Continued)

FOREIGN PATENT DOCUMENTS

JP 2003-259441 A 9/2003

(Continued)

OTHER PUBLICATIONS

3GPP TSG-RAN Joint WG1/WG2, Mar. 2006, Tdoc R2-060868 "Increased TTI Length", 3 pages.

(Continued)

*Primary Examiner* — Kwang B Yao
*Assistant Examiner* — Nguyen Ngo
(74) *Attorney, Agent, or Firm* — Osha • Liang LLP

(57) ABSTRACT

A controlling method and a radio base station apparatus capable of variably determining a Transmission Time Interval (TTI) length in accordance with a communication environment of a mobile terminal is disclosed. The radio base station apparatus includes a receiving section receiving information via an uplink channel; and a scheduler variably determining a Transmission Time Interval (TTI) length for any one of an uplink shared channel and a downlink shared channel or both based on at least any of a moving speed of a mobile terminal, location of the mobile terminal in a cell, a provided throughput value, and a number of retransmissions obtained from the received information. Preferably, the scheduler includes a TTI length allocation table describing relationships between parameter values and the corresponding TTI length, the parameters being used for estimating the location and/or the moving speed of the mobile terminal.

2 Claims, 2 Drawing Sheets

U.S. PATENT DOCUMENTS

| | | | |
|---|---|---|---|
| 2006/0160556 A1* | 7/2006 | Mueller et al. | 455/522 |
| 2008/0014978 A1* | 1/2008 | Kaneko et al. | 455/522 |
| 2008/0212524 A1* | 9/2008 | Niwano | 370/329 |
| 2008/0310385 A1* | 12/2008 | Iochi et al. | 370/345 |
| 2009/0268695 A1* | 10/2009 | Zhao et al. | 370/336 |
| 2010/0069032 A1* | 3/2010 | Kent et al. | 455/276.1 |

FOREIGN PATENT DOCUMENTS

| | | |
|---|---|---|
| JP | 2004-064797 A | 2/2004 |
| JP | 2005-204078 A | 7/2005 |
| JP | 2005-524365 A | 8/2005 |
| JP | 2007-519380 A | 7/2007 |
| WO | 2005107311 A1 | 11/2005 |
| WO | 2006008820 A1 | 1/2006 |

OTHER PUBLICATIONS

3GPP TSG RAN Wg2 #52, Mar. 2006, R2-060944 "HARQ Considerations", 15 pages.

Written Opinion issued in PCT/JP2007/059122, mailed on Aug. 7, 2007, 3 pages.

International Search Report issued in PCT/JP2007/059122, mailed on Aug. 7, 2007, w/translation, 5 pages.

Chinese Office Action for Application No. 200780023594.6, mailed on Aug. 9, 2010 (7 pages).

* cited by examiner

FIG.2A

EXAMPLE WHERE MOVING SPEED AND
LOCATION OF UE ARE USED AS REFERENCES

| AVERAGE CQI \ ESTIMATED DOPPLER FREQUENCY $f_D$ (Hz) | $0..f_{D1}$ | $f_{D1}..f_{D2}$ | $f_{D2}..f_{D3}$ |
|---|---|---|---|
| $CQI_1 \cdots CQI_2$ | $L_1$ | $L_2$ | $L_3$ |
| ... | | | |
| $CQI_i \cdots CQI_j$ | $L_i$ | $L_j$ | $L_k$ |
| ... | | | |
| $CQI_m \cdots CQI_n$ | $L_l$ | $L_m$ | $L_n$ |

$f_D$: POSITIVE REAL NUMBER, $f_{D1} < \cdots < f_{Dn}$
$L_n$: POSITIVE INTEGRAL NUMBER, $L_1 < \cdots < L_n$

FIG.2B

EXAMPLE WHERE AVERAGE THROUGHPUT
IS USED AS REFERENCE

| AVERAGE THROUGHPUT (bps) | TTI LENGTH |
|---|---|
| $T_1 \cdots T_2$ | $L_1$ |
| ... | |
| $T_i \cdots T_j$ | $L_i$ |
| ... | |
| $T_m \cdots T_n$ | $L_n$ |

$T_n$: POSITIVE REAL NUMBER, $T_1 > \cdots > T_n$

RADIO COMMUNICATION METHOD AND RADIO BASE STATION APPARATUS BASED ON VARIABLE TTI LENGTH CONTROL

TECHNICAL FIELD

The present invention generally relates to control of Transmission Time Interval (TTI) length in a radio communication system, and more specifically to control of variable TTI length adapted to the communication environment of a mobile station.

BACKGROUND ART

In a conventional method where transmission information is allocated into a plurality of subcarriers, while a frequency diversity effect may be expected, a burden of signaling for connection control and allocation control of radio resources may be disadvantageously increased. When an amount of transmitting/receiving information is increased, the overhead is relatively increased and the capacity is reduced. Further, when a packet is not correctly received, retransmission process becomes necessary. As a result, the number of transmissions is increased and the overhead is further increased.

To reduce the increase of the overhead due to the transmitting/receiving control information, there is proposed a method of changing a length of the Transmission Time Interval (TTI) in, for example, 3GPP TSG-RAN Joint WG1/WG2, Athens, Greece, 27-31, March 2006, R2-060868. In this document, while the allocation of frequency resources and a modulation method are left unchanged, the TTI length is increased by transmitting data blocks for a transport channel (transport blocks) by use of a plurality of subframes. In this method, for example, when the TTI length is multiplied by "N" times (using sequential N subframes), the amount of control information for a layer 1 is reduced by approximately "1/N".

On the other hand, there is proposed another method of changing the TTI length in accordance with a packet size in, for example, 3GPP TSG-RAN WG2 #52, Athens, Greece, 27-31 Mar. 2006, R2-060944. In this method, it is not necessary to divide a packet into a prescribed TTI length (such as the length of one subframe). As a result, a burden of signaling for controlling information may be reduced.

DISCLOSURE OF INVENTION

Problems to be Solved by the Invention

However, unfortunately, in each of the above documents, there is no concrete description about in what specific communication status or communication environment the TTI length is to be changed.

The present invention is made in light of the circumstances and may provide a method of controlling a TTI length in accordance with communication status and communication environment of a mobile terminal (or user equipment (UE)) in the transmission where the TTI length is variably changed, and a configuration of a radio base station apparatus capable of carrying out the method.

Means for Solving the Problems

To achieve the apparatus, a scheduler of the radio base station apparatus determines the TTI length for a downlink shared channel (DL-SCH) and/or an uplink shared channel (UL-SCH) based on communication environment of the mobile terminal, namely, for example, any of (1) the position of the mobile terminal (UE) in a cell (whether located at a cell boundary)
(2) moving speed of the mobile terminal
(3) provided throughput value
(4) average number of retransmissions or a combination thereof.

More specifically, according to an aspect of the present invention, there is provided a radio base station apparatus including a receiving section receiving information via an uplink channel; and a scheduler variably determining a Transmission Time Interval (TTI) length for any one of an uplink shared channel and a downlink shared channel or both based on at least any of a moving speed of a mobile terminal, location of the mobile terminal in a cell, a provided throughput value, and a number of retransmissions obtained from the received information.

In a preferred embodiment, the scheduler includes a TTI length allocation table describing relationships between parameter values and the corresponding TTI length, the parameters being used for estimating any one of the location and the moving speed of the mobile terminal or both.

The parameters used for estimating the location of the mobile terminal are a CQI value, SIR, SINR, received signal power, and the number of retransmissions, and the like.

The parameters used for estimating the moving speed of the mobile terminal may be an estimated Doppler frequency.

The TTI length allocation table may describe relationships between average throughput values and the corresponding Transmission Time Interval length, the average throughput value being provided as a parameter reflecting both the location and the moving speed of the mobile terminal.

Further, according to still another aspect of the present invention, the scheduler includes a function having at least any of the moving speed of the mobile terminal, the location of the mobile terminal in the cell, the provided throughput value, and the number of retransmissions as arguments.

ADVANTAGEOUS EFFECT OF THE INVENTION

According to an embodiment of the present invention, the TTI length may be appropriately changed in accordance with the communication status and the communication environment of a mobile terminal, and as a result, the overhead may be reduced and the capacity may be increased.

BRIEF DESCRIPTION OF THE DRAWINGS

FIG. 2A is a drawing showing an example of a TTI length allocation table used for the radio base station apparatus in FIG. 1; and FIG. 2B is a drawing showing another example of a TTI length allocation table used for the radio base station apparatus in FIG. 1.

EXPLANATION OF REFERENCES

Figure 1:
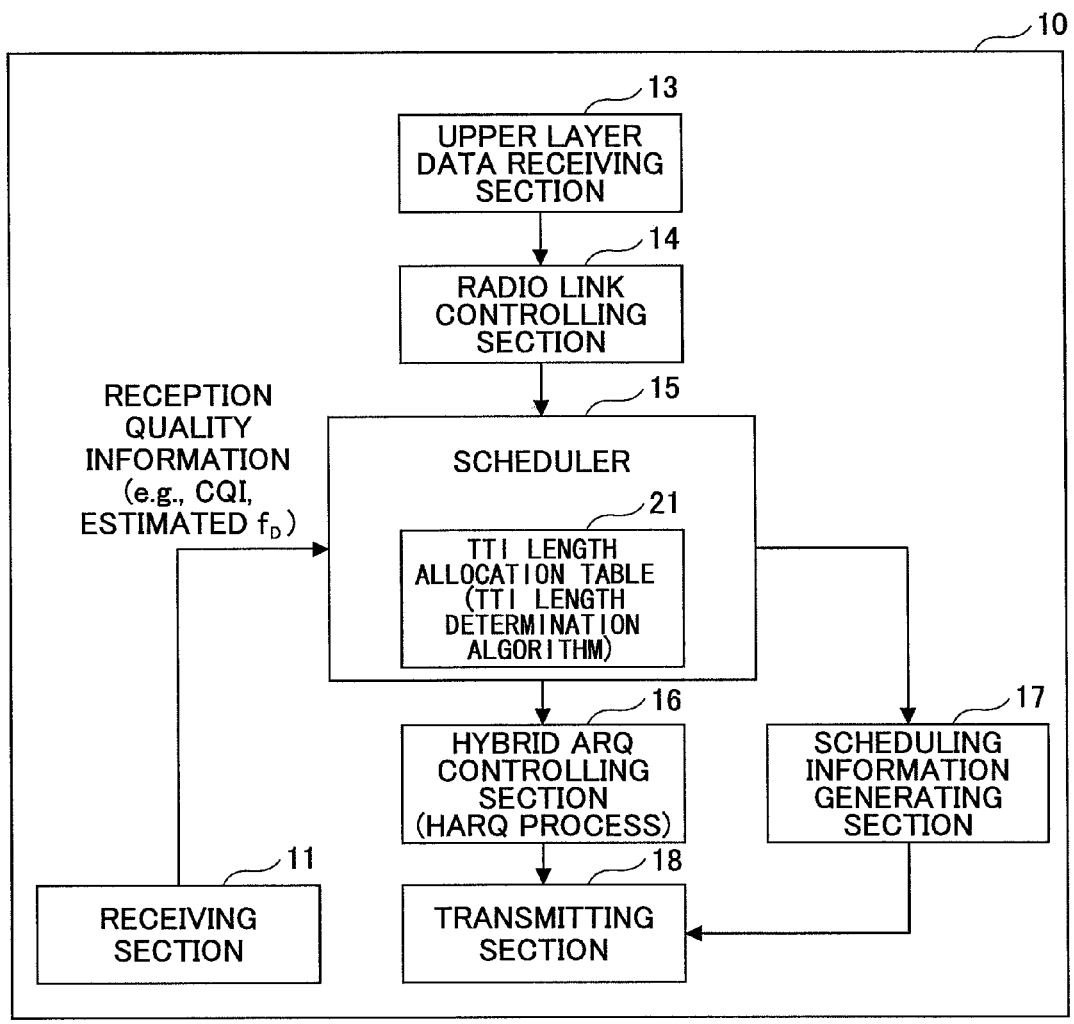
FIG. 1 is a schematic block diagram showing an exemplary configuration of a radio base station apparatus according to an embodiment of the present invention.

10 RADIO BASE STATION APPARATUS (RADIO COMMUNICATION APPARATUS)
11 RECEIVING SECTION
13 UPPER LAYER DATA RECEIVING SECTION
14 RADIO LINK CONTROLLING SECTION
15 SCHEDULER

16 HYBRID ARQ CONTROLLING SECTION (RETRANSMISSION CONTROLLING SECTION)
17 SCHEDULING INFORMATION GENERATING SECTION
18 TRANSMITTING SECTION
21 TTI LENGTH ALLOCATION TABLE (TTI LENGTH DETERMINATION ALGORITHM)

BEST MODE FOR CARRYING OUT THE INVENTION

In the following, an embodiment of the present invention is described with reference to the accompanying drawings. In the embodiment, a case is described where a TTI length is determined especially for the first transmission.

According to an embodiment of the present invention, basically, there is provided a scheduler in the radio base station, and the scheduler variably controls the TTI length for an uplink shared channel and/or a downlink shared channel based on the communication environment of a mobile terminal (UE), namely, for example, any of the position of the mobile terminal (UE) in a cell, the moving speed of the mobile terminal, a provided throughput value, and the average number of retransmissions.

(1) When the mobile terminal is located at a cell boundary, the size of a data block allocated to a transport channel, which is a transport block (TB), is small. In this case, the reliability may be improved, but the overhead rate of downlink scheduling information (DL-SI) may be relatively increased. To overcome this situation, when the TTI length is increased, the overhead of the downlink scheduling information may be reduced and the system efficiency may be improved.

(2) When the moving speed of the mobile terminal is high, the fading fluctuation speed becomes high, thereby degrading the performance of following up an Adaptive Modulation and Coding scheme (AMC). In this case, the situation may not be improved even by decreasing the TTI length. On the other hand, when the TTI length is increased, an interleave effect in the time domain (a diversity effect in the time domain) may be expected to be increased. Therefore, high quality transmission may be achieved by increasing the TTI length.

(3) The term "provided throughput value" refers to a parameter value reflecting both the location and the moving speed of the mobile terminal in a cell.

(4) When the "average number of retransmissions" is large, the mobile terminal may be located at a cell boundary. Therefore, the overhead per retransmission may be relatively reduced by increasing the TTI length.

FIG. 1 is a schematic block diagram of a radio communication apparatus according to an embodiment of the present invention. The radio communication apparatus may be typically used as a radio base station, but may also be used as other radio communication apparatuses, in which the TTI length is variably controlled in accordance with the communication environment of a mobile terminal (user equipment). In this embodiment, since the radio communication apparatus is used in a radio base station, the apparatus is called a radio base station apparatus 10.

As shown in FIG. 1, the radio base station apparatus 10 includes a receiving section 11, an upper layer data receiving section 13, a radio link controlling section 14, a scheduler 15, a hybrid ARQ controlling section 16, a scheduling information generating section 17, and a transmitting section 18.

The receiving section 11 receives information from a mobile terminal via a channel. The receiving section 11 extracts reception quality information such as a CQI (Channel Quality Indicator) value and an estimated Doppler frequency "$f_D$" indicating a fading fluctuation rate from the received information and transmits the extracted reception quality information to the scheduler 15. Further, the receiving section 11 receives negative acknowledgement (NACK).

The upper layer data receiving section 13 receives U-plane data from an upper layer. The radio link controlling section 14 performs radio link control including the flow control and the segmentation of the transmission data based on the data from the upper layer.

The scheduler 15 performs allocation control of radio resources based on the information of the radio link control, the reception quality information, and the negative acknowledgement (NACK). On this occasion, the scheduler 15 determines the TTI length for the downlink shared channel and/or uplink shared channel based on the location information and the moving speed of the user, the throughput value reflecting both the location information and the moving speed, and the average number of retransmissions.

When the TTI length is determined based on the location of a mobile terminal, the scheduler 15 may determine whether the mobile terminal is at a cell boundary based on, for example, the CQI value reported via an L1 channel, or any of a Signal to Interference Ratio (SIR), a Signal to Interference and Noise power Ratio (SINR), received signal power, and the number of retransmissions, each measured in the mobile terminal and reported to the radio base station apparatus 10.

On the other hand, when the TTI length is determined based on the moving speed of a mobile terminal, the moving speed may be estimated based on the information received by the radio base station apparatus 10 via an uplink channel, or the mobile terminal may have a function to estimate the moving speed and report the estimated moving speed to the radio base station apparatus 10.

Further, the provided throughput value which is a parameter reflecting both the location and the moving speed of the mobile terminal in a cell may be used as criterion when the TTI length is determined.

In the example of FIG. 1, the scheduler 15 includes a TTI length determination algorithm 21 or a TTI length allocation table 21. Each of the TTI length determination algorithm 21 and the TTI length allocation table 21 is a tool for determining an appropriate TTI length based on the communication status or communication environment of the mobile terminal.

More specifically, when the TTI length determination algorithm 21 is employed, the TTI length may be determined based on a formula (function) using at least any one of the moving speed of the mobile terminal, the location of the mobile terminal, the average number of retransmissions, and the supporting throughput value as the argument of the function.

On the other hand, when the TTI length allocation table 21 is employed, the allocation table is provided in advance. The table describes cases each specified by the values of parameters (such as the above-mentioned the CQI, SIR, SINR, received signal power, the number of retransmissions, and the supporting throughput value) for estimating the moving speed and/or the location and the corresponding TTI length to be selected. Therefore, an appropriate TTI length may be selected by referring to the table.

FIGS. 2A and 2B are drawings each showing an exemplary configuration of the TTI length allocation table 21. More specifically, FIG. 2A shows where the moving speed of a mobile terminal is used as the parameter, and FIG. 2B shows where an average throughput value is used as the parameter.

In FIG. 2A, the TTI length is determined based on an average CQI value and an estimated Doppler frequency "$f_D$". The average CQI value may be calculated from the reported CQI values by using any averaging algorithm. The estimated Doppler frequency "$f_D$" shows how fast the fading fluctuates. Because of this feature, the faster the mobile terminal moves, the higher the frequency value becomes.

In FIG. 2A, for example, when the average CQI value is in the range between $CQI_1$ and $CQI_2$, and the estimated Doppler frequency "$f_D$" is in the range between $f_{D1}$ and $f_{D2}$, the value "$L_2$" is selected as the TTI length. Herein, a value "$f_D$" is a positive real number, and a value "$L_n$" is a positive integral number (such as the number of sequential subframes). For example, the length of one subframe may be 0.5 ms.

In FIG. 2B, the TTI length is determined based on the average throughput value "Tn" (bps). The average throughput value may be calculated from the provided throughput values by using any averaging algorithm. The average throughput value is a positive real number.

As described above, when the scheduler 15 includes the TTI length allocation table 21 as shown in FIGS. 2A and 2B, the scheduler 15 determines the TTI length for the downlink shared channel and/or the uplink shared channel by referring to the table 21 based on the input information. However, the present invention is not limited to this embodiment in FIGS. 2A and 2B, and the TTI length may be determined based on any parameter capable of estimating the location and/or the moving speed of the mobile station.

Referring back to FIG. 1, the hybrid ARQ controlling section 16 performs hybrid ARQ (retransmission) control in response to a retransmission request from the mobile terminal. The "hybrid ARQ" is a technique in which an error correction technique is added to an exiting Automatic Repeat Request (ARQ) technique which is for detecting an error and requesting retransmission. As a result, when the hybrid ARQ (retransmission) control is performed, the number of packet retransmissions may be reduced by transmitting an error correcting code for error correction in advance.

The scheduling information generating section 17 generates downlink scheduling information including the TTI length information and transmits the generated information to the transmitting section 18.

The transmitting section 18 sequentially transmits the transmission data based on the scheduling result from the scheduler 15 and the retransmission control result from the hybrid ARQ controlling section 16.

According to the configuration described above, it becomes possible to dynamically control (determine) the TTI length for a shared channel in accordance with the concrete communication environment of a mobile terminal. As a result, the overhead may be reduced and the capacity may be increased.

The present international application claims priority from Japanese Patent Application No. 2006-128001 filed on May 1, 2006, the entire contents of which are hereby incorporated herein by reference.

The invention claimed is:

1. A radio base station apparatus comprising:
a receiving section receiving information via-an uplink channel; and
a scheduler variably determining a Transmission Time Interval (TTI) length for any one of an uplink shared channel and a downlink shared channel or both based on at least any of a moving speed of a mobile terminal, location of the mobile terminal in a cell, a provided throughput value, and a number of retransmissions obtained from the received information, wherein
the scheduler includes a TTI length allocation table describing relationships between parameter values and the corresponding TTI length, the parameters being used for estimating any one of the location and the moving speed of the mobile terminal or both, and
the parameters used for estimating the location of the mobile terminal includes at least any of a CQI value, SIR, SINR, received signal power, and the number of retransmissions.

2. A radio base station apparatus comprising:
a receiving section receiving information via-an uplink channel; and
a scheduler variably determining a Transmission Time Interval (TTI) length for any one of an uplink shared channel and a downlink shared channel or both based on at least any of a moving speed of a mobile terminal, location of the mobile terminal in a cell, a provided throughput value, and a number of retransmissions obtained from the received information, wherein
the scheduler includes a TTI length allocation table describing relationships between parameter values and the corresponding TTI length, the parameters being used for estimating any one of the location and the moving speed of the mobile terminal or both, and
the TTI length allocation table describes relationships between average throughput values and the corresponding Transmission Time Interval length, the average throughput value being provided as a parameter reflecting both the location and the moving speed of the mobile terminal.

* * * * *